June 14, 1949.
M. T. KOLESNIKOFF
2,472,907
FOCUS AND MAGNIFICATION INDICATOR
FOR PHOTOGRAPHIC ENLARGERS
Filed Aug. 13, 1945
4 Sheets-Sheet 3
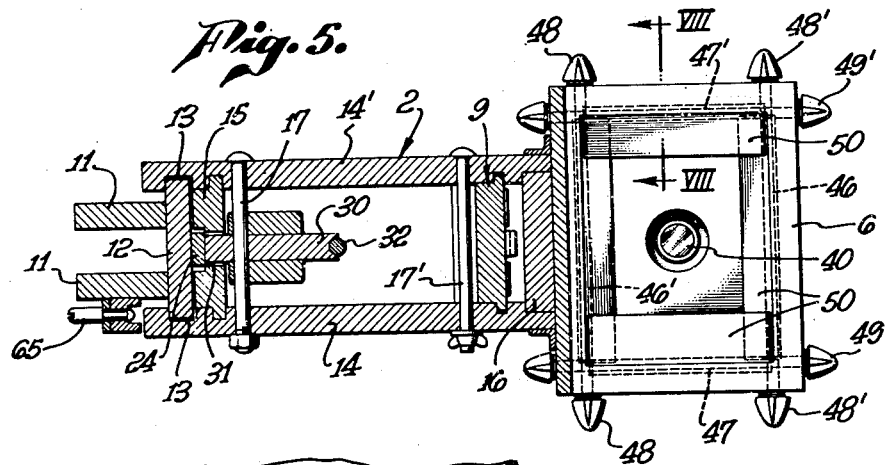
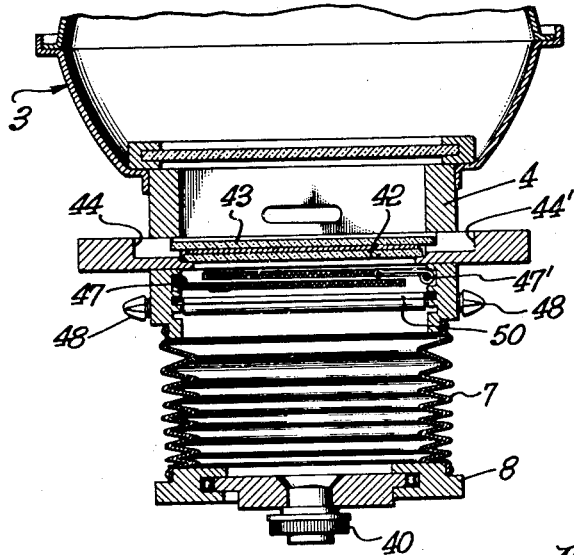
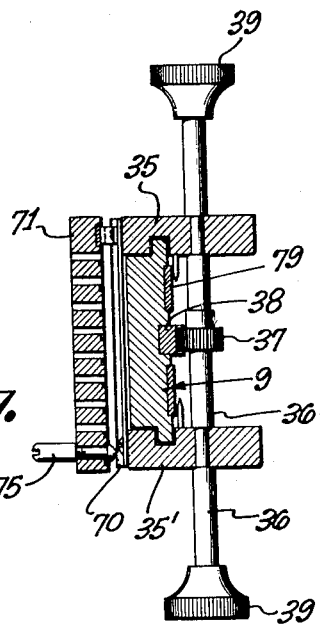
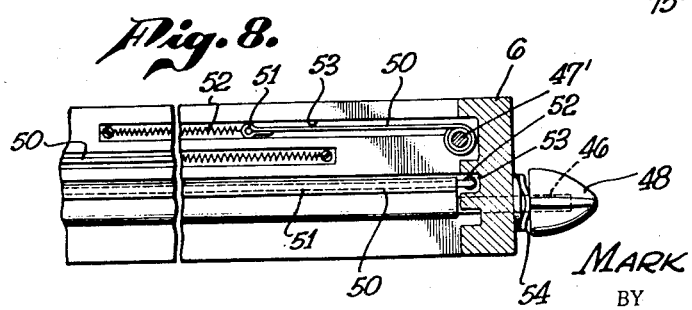
INVENTOR
MARK T. KOLESNIKOFF,
BY
*C. P. Meehette*
ATTORNEY

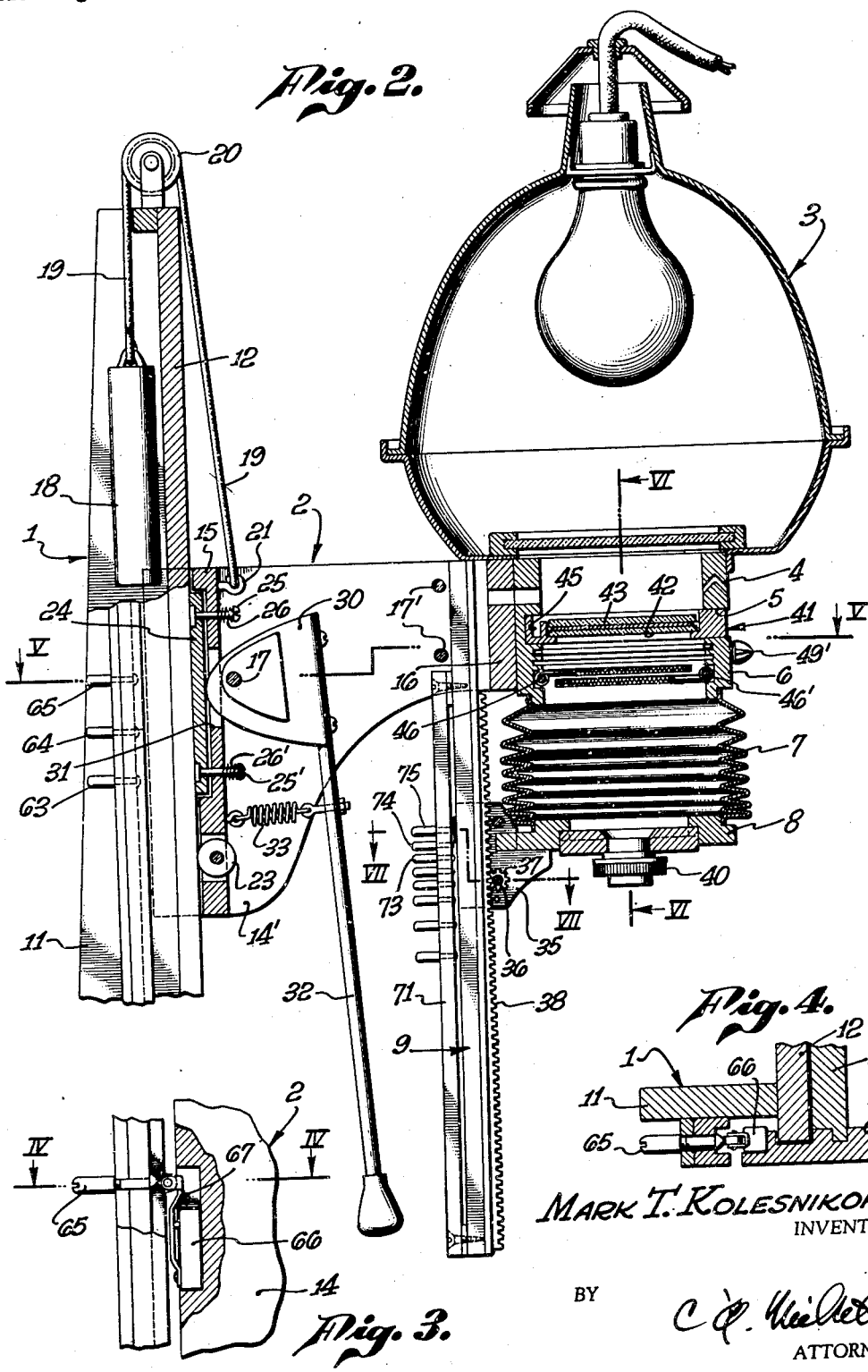

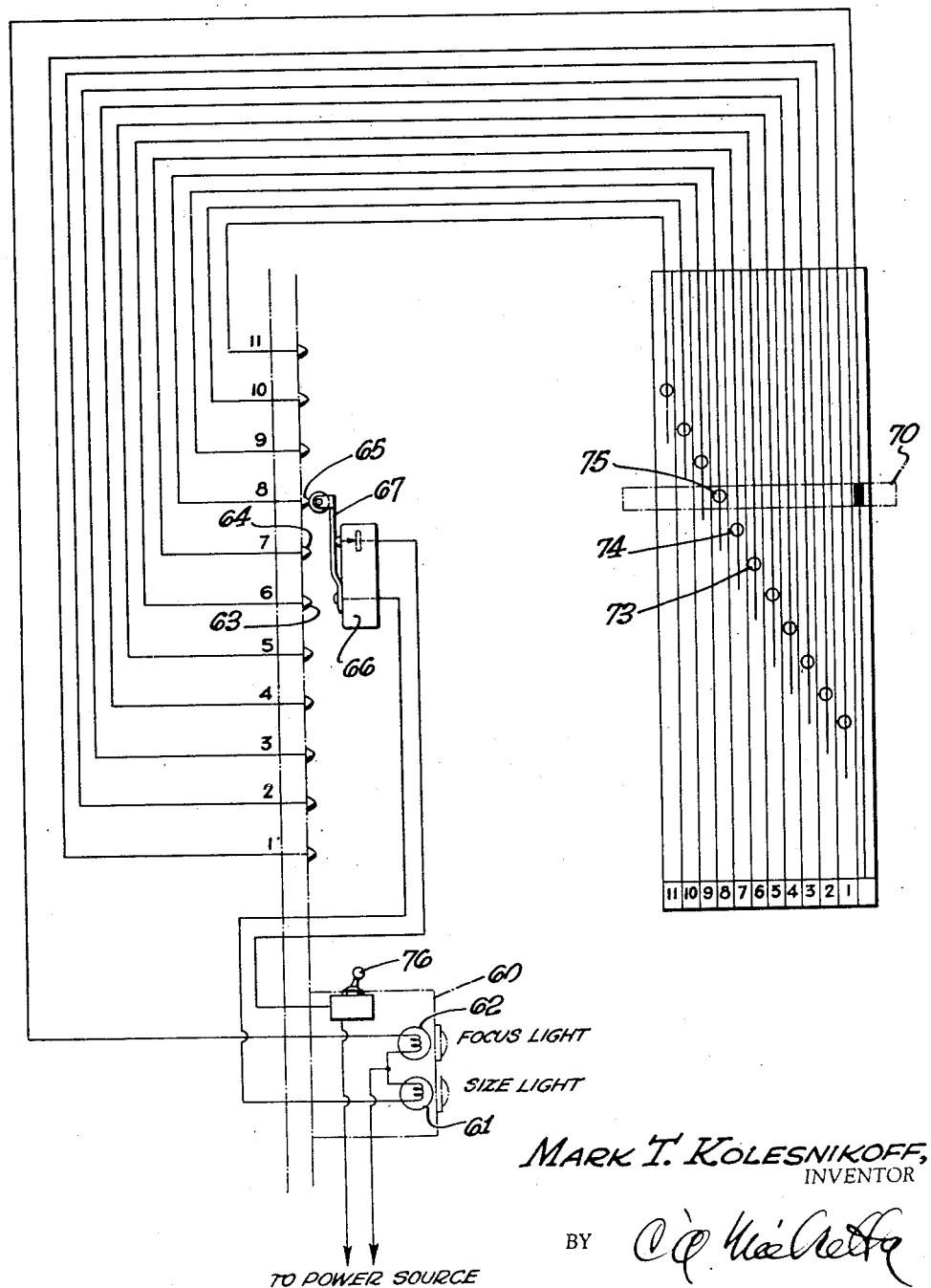

Patented June 14, 1949

2,472,907

UNITED STATES PATENT OFFICE 2,472,907

FOCUS AND MAGNIFICATION INDICATOR
FOR PHOTOGRAPHIC ENLARGERS

Mark T. Kolesnikoff, Los Angeles, Calif.

Application August 13, 1945, Serial No. 610,451

4 Claims. (Cl. 88—24)

This invention relates to improvements in photographic enlargers.

Photographic enlargers, whether of the vertical or horizontal type, generally consist of a support upon which there is mounted a movable enlarging camera. In the vertical types, the support itself is vertical and is generally provided with an adjustably positionable bracket, the bracket carrying a light source and an enlarging camera. The entire bracket is moved up and down so as to obtain a desired magnification or enlargement. The lens mount of the camera must also be moved individually so as to properly focus the projected image upon the enlargement plane. A great deal of time is consumed in making these adjustments.

One aspect of the present invention is directed toward automatic, electrically energized means whereby signal means positively indicate when the entire camera and bracket have been moved to a position at which a desired magnification or enlargement size can be obtained, and another signal means is actuated when the lens mount is in proper focal relationship with the enlargement plane at the desired magnification. By such means the entire operation is greatly facilitated since positive, accurate signalling means are provided and it is not necessary to visually observe the projected image so as to make certain that both magnification and focus are correct.

The invention, moreover, is directed to a simplified construction wherein the movement of the entire enlarging camera and bracket is greatly facilitated and the camera and bracket may be quickly and firmly positioned at any desired point. Again, the invention discloses improvements in the enlarging camera in that readily accessible masking means are provided so that any desired portion of a negative may be projected and enlarged.

A further advantage of the construction disclosed herein lies in the provision of an improved slide or negative holder and the provision of means whereby such holder may be inserted into or withdrawn from the camera from any position around the equipment.

It is an object of the present invention, therefore, to disclose and provide an improved photographic enlarger.

Another object of the invention is to disclose and provide a photographic enlarger which is simple in construction, positive in its operation, and in which accuracy is automatically attained.

A still further object of the invention is to disclose and provide a photographic enlarger in which signal means are actuated when the device is at a desired magnification and in focus.

These and other objects and advantages of the invention will become apparent to those skilled in the art from the following description of an exemplary form illustrated in the appended drawings, in which:

Fig. 2 is an enlarged side elevation, partly in section, of the outer portion of the camera.

Fig. 3 is an enlarged section, partly broken away, of the bracket and vertical support.

Fig. 4 is a horizontal section taken along the plane IV—IV of Fig. 3.

Fig. 5 is a horizontal section taken along the plane V—V of Fig. 2.

Fig. 6 is a vertical section taken along the plane VI—VI of Fig. 2.

Fig. 7 is a horizontal section taken along the plane VII—VII of Fig. 2.

Fig. 8 is an enlarged transverse section taken along the plane VIII—VIII of Fig. 5.

Fig. 9 is a wiring diagram.

Figure 1:
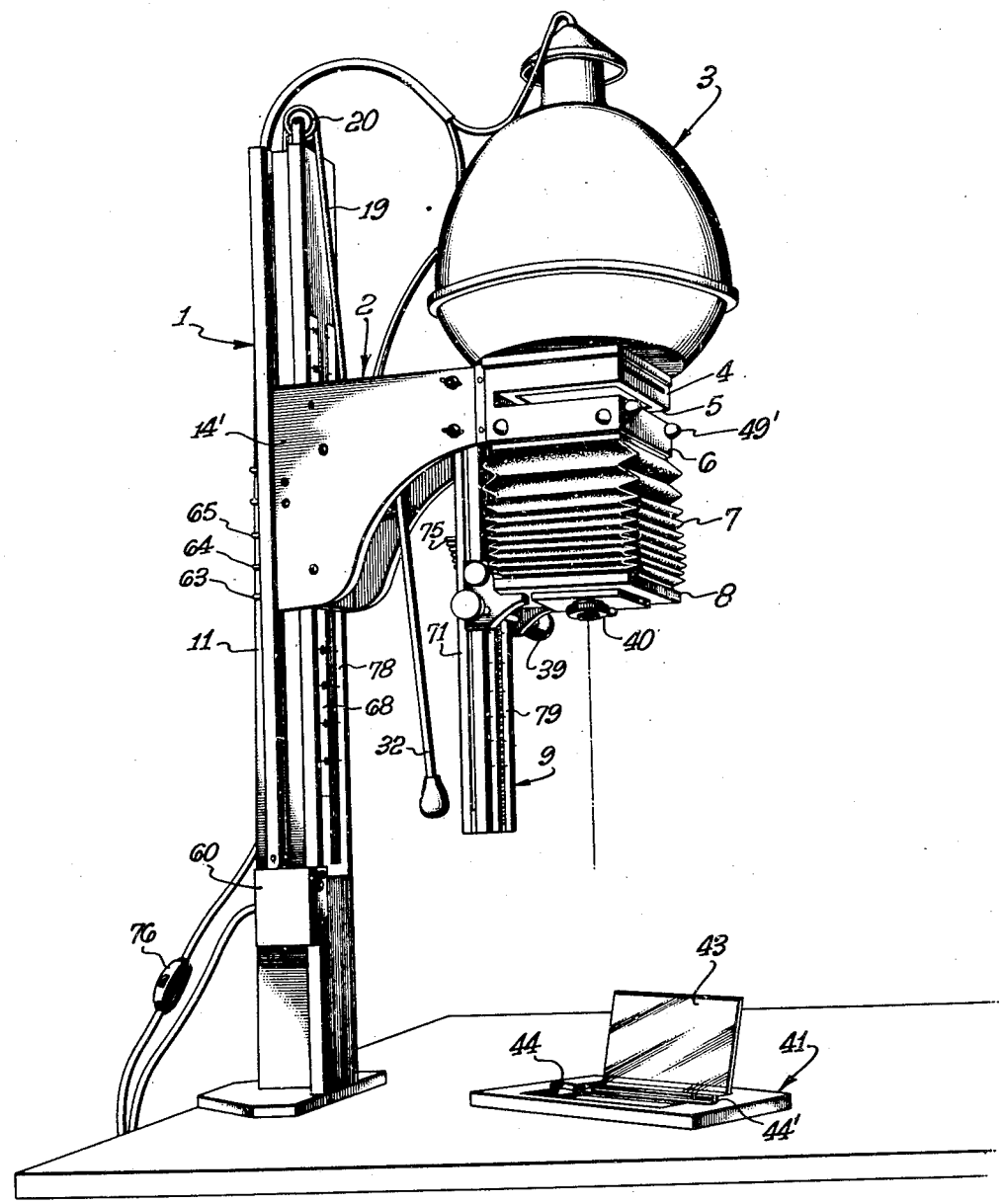
Fig. 1 is a three-quarter side view of the enlarging camera.

As shown in Fig. 1, the form of enlarger there illustrated includes a vertical support 1 which may be provided with any suitable base or clamp for attaching the same to a work table. A vertically movable bracket, generally indicated by the numeral 2, is mounted upon the support, the bracket carrying the enlarging camera and appurtenances, such as, for example, the light housing 3 and body portion 4 including a slot or aperture 5 adapted to receive the negative holder, a mat housing 6, bellows 7 and lens mount 8. The bracket includes a vertical guide 9 on which the lens mount 8 may be adjustably positioned.

The construction of the vertical support 1 will be best understood from a consideration of Figs. 2, 3, 4 and 5. The vertical support may as there shown consist of an upstanding member or members 11 and a face plate 12, the face plate extending beyond the members 11 so as to form vertical guides adapted to be slidably received in grooves 13 formed in the inner faces of spaced face plates 14 and 14' of the bracket 2. The face plates 14 and 14' may be connected by means of a slotted member 15 and member 16 and held in assembled position by means of carriage bolts or the like 17 and 17'.

The bracket 2 may be counterbalanced by means of a counterweight 18 attached to a cable 19 passing over a pulley 20 mounted on the top of the support 1, the other end of the cable being connected to the bracket 2 as, for example, to the screw eye 21 held by the slotted spacing member 15. The counterweight 18 may move between the spaced upstanding elements 11.

In order to rapidly raise or lower the bracket 2 and firmly position it in any desired vertical position, such bracket may be provided with a roller or other anti-friction means 23 in rolling engagement with the center portion of the face 12. The slotted spacing member 15 may also be provided with a recess in which a presser plate 24 is held. The presser plate may be mounted on studs 25 and 25' extending through the spacer 15 and spring means 26 and 26' may be provided for normally urging the presser plate 24 away from the face 12.

Cam-actuated means are also carried by the bracket 2 for releasably holding the bracket in position, such cam-actuated means acting against the presser plate 24. In Figs. 2 and 5 such cam means are shown as comprising an elliptical cam 30 pivoted upon the carriage bolt 17, a portion of the cam 30 extending into contact with the presser plate 24 through the slot 31 in the spacer member 15. The cam 30 is shown provided with a handle 32 and a spring 33 which normally urges the cam 30 into pressure contact with the plate 24.

It will be evident that when the handle 32 is moved away from the vertical support 1, pressure of the plate 24 against the face 12 is relieved so that the bracket 2 may be moved up and down very readily. In order to position the bracket 2, the handle 32 may be released or manually moved toward the vertical support 1, thereby causing the cam 30 to forcibly press the plate 24 into contact with the face 12 of the vertical support 1 and thereby frictionally hold the bracket in the adjusted position upon the vertical support. It will be noted that this arrangement exerts a clamping action upon the transversely extending guides which slidably fit the grooves 13 of the side members 14 of the bracket, as best shown in Fig. 5.

The downwardly extending guide 9 is in sliding engagement with the lens mount 8 which is attached to the side members 35 and 35'. These side members are in sliding engagement with the guide 9 as best shown in Fig. 7, and carry a shaft 36 journaled therein, this shaft carrying a pinion 37 in engagement with a rack 38 mounted upon the stationary, downwardly extending guide 9. Knobs 39 permit the shaft and pinion to be rotated, thereby moving the entire lens mount 8 up and down the guide 9.

The lens mount 8 may carry any suitable camera or enlarging lens 40. The lens mount 8 is connected by means of the bellows 7 with a mat housing 6. It will be noted that the mat housing 6 is separated from the housing 4 by a slot 5 which is open on three sides of the housing. This slot slidably receives a negative holder 41. The negative holder preferably consists of a frame provided with an inwardly extending lower lip adapted to support a glass or other transparent plate 42 on which the desired negative may be placed or supported and covered by the glass plate 43. In this manner, flexible negatives may be properly held in the enlarging camera or slides may be suitably supported.

In order to permit the cover plate or slide to be readily removed from the negative holder 41, finger-receiving depressions may be formed in opposite sides of the frame, as indicated in Fig. 1 and in Fig. 6, the depressions being there identified by the numerals 44 and 44'. Along the longitudinal side of the frame a groove or receptacle is provided as indicated at 45, so that in the event the operator desires to remove the negative or remove the cover glass, the edge of such cover glass may be placed in the groove 45 and held in an upright position as best shown in Fig. 1. This obviates the necessity of laying the cover glass down upon a supporting surface and thereby prevents such cover glass from becoming inadvertently contaminated with stains, dirt or the like, which may impair the accuracy of the enlargement.

It is also to be noted that the edges of the negative holder 41 extend from the slot 5 in three directions, thereby permitting the operator to insert, remove or adjust the position of the negative holder very readily from either side or front of the table upon which the device is mounted.

The mat housing 6 positioned between the negative slide and lens mount is provided with two opposing pairs of mat-actuating shafts. One pair of shafts is indicated at 46 and 46' and another pair at 47 and 47'. The shafts of one pair extend transversely to the shafts of the other pair. The ends of these shafts protrude beyond the mat housing 6 and are provided with actuating knobs. Knobs 48 are carried by the ends of shaft 46, knobs 48' by the ends of shaft 46', and knobs 49' by the ends of shaft 47'.

Each of these shafts has coiled thereon a black, non-actinic, flexible, opaque mat, the free end of each mat being yieldably urged and guided across the optical axis of the camera. As shown in Fig. 8, shaft 47' carries a mat or curtain 50, the free end of such curtain being looped around a thin wire 51, the ends of such wire being then yieldably urged across the opening within the housing by means of the spring 52.

Grooves are formed on the inner surface of the mat housing 6 such as, for example, the groove 53 for the purpose of guiding the ends of wires 51 and retaining the springs 52. The knobs, such as the knob 48 in Fig. 5, are frictionally pressed against the housing by means of spring washers 54 so that the shafts such as 46 and 47 do not freely rotate but must be manually rotated by actuation of the knobs. In this manner the operator may from any position around the device readily adjust the position of the various mats, masking means or curtains, so as to limit the area of the negative being enlarged in the device.

As is well known, the magnification obtained in an enlarging camera varies with the distance of the lens 40 from the printing surface or printing plane. For purposes of example, the top of the table upon which the device is mounted may constitute the printing plane. Whenever the bracket 2 is bodily moved vertically into a different enlarging position, the image projected by the camera gets out of focus and it is then necessary to separately adjust the lens mount 8 in order to place the projected image in focus. In accordance with the present invention, two electrically energized signal means are provided, these signal means being arranged to be simultaneously actuated when the bracket and the lens mount are both at positions correlated for proper focus and magnification or size of enlargement. Such signal means may be contained in a small housing 60 (Fig. 1) and as shown in the wiring diagram, such housing may contain two light sources 61 and 62, 61 indicating proper magnification (when illuminated) whereas 62 indicates proper focus for such magnification. When both signal means are energized or illuminated, then the operator knows that his equipment is in proper position.

In order to attain this desirable result, the vertical support 1 is provided with a series of switch-actuating points, buttons, or the like, 63, 64, 65, etc., one of such points 65 being indicated in Figs. 3, 4 and 5. The bracket 2 carries a switch 66 provided with an arm 67 arranged to be moved by any one of the switch-actuating points so as to close the switch 66. The various switch-actuating points 63, 64, 65, etc., are so positioned as to cause the arm 67 to close the switch 66 and thereby actuate the signal means 61 whenever the bracket 2 is at a predetermined distance from the enlarging plane, such predetermined distance giving rise to a specified magnification. For example, the various switch-actuating points may be arranged so as to indicate 1:1, 2:1, 2½:1, 3:1, 4:1, 6:1 and 8:1 enlargements or magnifications. It will be evident that as the bracket 2 is moved upwardly, the switch arm 67 will sequentially contact the various switch-actuating points, thereby causing the signal means 61 to be sequentially actuated or energized. The face 12 of the vertical support may also carry indices as indicated at 68, which become visible as the bracket 2 is moved upwardly, thereby giving a visible indication of which magnification is indicated when the signal means is actuated.

After positioning the bracket 2 with the switch arm 67 in contact with a desired switch-actuating point such as 65, it would still be necessary for the operator to manually adjust the lens mount 8 by means of the knobs 39 and to observe the projected image until it is in sharp focus. In order to eliminate this tedious operation, the device may be provided with automatic means which actuate the signal means 62 and thereby indicate when the lens mount 8 has been moved into proper focus. This result is automatically obtained by providing a movable contact bar upon the lens mount, such contact bar being best shown at 70 in Fig. 7. The vertical guide 9 may be provided with a paralleling carrier 71, such carrier being provided with a plurality of terminals 73, 74, 75 and the like. Each of these terminals 73, 74, 75, etc., is electrically connected with one of the switch-actuating points 63, 64, 65, etc. The precise position of the terminals 73—75 is ascertained by calibrating the instrument with the lens 40. The movable contact bar 70 is thus capable of forming a shunt connection with any one of the switch-actuating points 63—65 and when the switch 66 has been closed and signal means 61 is energized, it is only necessary for the operator to move the lens mount rapidly until signal means 62 is actuated. It should be noted that the points 63—65, etc., cooperating with the switch arm 67, effectively form a type of multiple throw selector switch means which is combined with a single throw switch means effectively formed by the switch arm 67 and switch 66, and that they operate simultaneously. The bar 70 and contact points 73—75, etc., also effectively form a type of multiple throw selector switch means.

Although the movable bar 70 may make contact with a variety of terminals carried by the support 71, only one of such terminals is correlated to the switch-actuating point upon which switch arm 67 is at rest so that the device is substantially fool-proof and absolutely accurate both as to magnification and focus. Such magnification is automatically obtained.

A detailed description of the wiring diagram is believed to be unnecessary, power being supplied to the work from any suitable source, a main switch being indicated at 76 for placing the device in operative condition.

It is to be understood that in the event the lens 40 is changed, then the position of the various switch-actuating points and terminals must also be changed in order to have the device operate in the automatic manner hereinbefore referred to. In the event the operator desires to use a different lens for just for a short period of time, markings may be applied to an index strip 78 carried by the face of the vertical support 1, and similar markings (correlated to focusing position) applied to a strip of paper or the like 79 attached to the face of the downwardly extending guide 9 carried by the bracket 2.

The operation and uses of the devices described hereinabove will be readily apparent to those skilled in the art. It will be readily understood that the enlarging camera of this invention may have all or only one or more of the improvements here disclosed embodied therein. Moreover, the specific details of construction shown in the drawings need not be used; for example, the bracket 2 may be fabricated or it may be cast; the vertical support may be of wood or metal, etc. The relationship of the major elements gives rise to the advantages recited hereinbefore and many changes and modifications may be made without departing from the invention disclosed herein.

I claim:

1. In a photographic enlarging device including a fixed vertical support, a vertically movable bracket on said support, and an enlarging camera on said bracket, said camera including a vertical guide and a lens mount movably positioned thereon, the combination of: a series of switch-actuating points on the vertical support, said switch-actuating points being vertically spaced with respect to a fixed enlarging plane and correlated to a series of different magnification; a switch carried by the bracket and provided with an arm arranged to be moved by any one of the switch-actuating points to close the switch; an electrical circuit including the switch-actuating points and switch and an indicator, said circuit being energized when said switch is closed; a series of terminals on the vertical guide, each thereof electrically connected to one of the switch-actuating points; and a shunt circuit including a signal element and a movable terminal, the movable terminal being carried by the lens mount whereby said signal element is energized only when the bracket and the lens mount are in correlated positions both as to desired magnification and focus for such magnification.

2. In a photographic enlarging device including a fixed vertical support, a vertically movable bracket on said support and an enlarging camera on said bracket, said camera including a vertical guide and a lens mount movably positioned thereon, the combination of: an electrically energizable focus indicating signal means, a first multiple throw selector switch means having a plurality of switch elements arranged to selectively sequentially connect the various switch elements in response to vertical movement of the bracket on the vertical support; a second multiple throw selector switch means arranged to selectively sequentially connect the various switch elements thereof in response to vertical movement of the lens mount on the vertical guide; and electric circuit means correlatedly connecting the various switch elements of said first and second selector switch means and a focus indicating switch means in a predetermined manner whereby said focus indicating signal means will be energized when said bracket and lens mount are both at positions correlated for proper focus and magnification.

3. In a photographic enlarging device including a longitudinal support, a longitudinally movable bracket on said support and an enlarging camera on said bracket, said camera including a longitudinal guide parallel to the longitudinal support and a lens mount movably positioned thereon, the combination of: electrically responsive signal means, a first multiple throw selector switch means having a plurality of switch elements arranged to be selectively sequentially effectively connected in response to longitudinal movement of the bracket with respect to the longitudinal support; a second multiple throw selector switch means arranged to be selectively sequentially effectively connected in response to longitudinal movement of the lens mount with respect to the guide; and electric circuit means correlatedly connecting the first and second selector switch means and said signal means whereby said signal means will indicate when said bracket and said lens mount are both at positions correlated for proper focus and magnification.

4. In a photographic enlarging device including a fixed support, a movable bracket on said support and an enlarging camera on said bracket, said camera including a movable lens mount, the combination of: a single throw switch electrically connected to a signal means; multiple throw selector switch means arranged for sequentially cooperating with the movable single throw switch in response to movement of the bracket on the support; a contact bar connected to a second signal means; a multiple contact means arranged for sequential engagement with the contact bar upon movement of the lens mount over said camera; and circuit means connecting said multiple throw selector switch means with the multiple contact means for insuring simultaneous energization of both signal means when the bracket and lens mount are both at positions correlated for proper magnification and focus.

MARK T. KOLESNIKOFF.

REFERENCES CITED

The following references are of record in the file of this patent:

UNITED STATES PATENTS

| Number | Name | Date |
| --- | --- | --- |
| 1,676,033 | Kinzler | July 3, 1928 |
| 1,793,837 | Caps | Feb. 24, 1931 |
| 2,232,146 | Simmon | Feb. 18, 1941 |
| 2,245,527 | Grabfield | June 10, 1941 |
| 2,298,741 | Laxna | Oct. 13, 1942 |
| 2,326,542 | Leonard | Aug. 10, 1943 |

FOREIGN PATENTS

| Number | Country | Date |
| --- | --- | --- |
| 218,267 | Great Britain | June 10, 1924 |